United States Patent [19]

Cullie

[11] 4,418,714

[45] Dec. 6, 1983

[54] BLOW DOWN RING LOCKING DEVICE

[75] Inventor: Eugene C. Cullie, Tappan, N.Y.

[73] Assignee: Teledyne Farris Engineering, Palisades Park, N.J.

[21] Appl. No.: 276,934

[22] Filed: Jun. 24, 1981

[51] Int. Cl.³ .............................................. F16K 17/20
[52] U.S. Cl. .................................... 137/478; 137/382; 137/385
[58] Field of Search ............... 137/469, 475, 476, 477, 137/478, 385, 382; 285/404

[56] References Cited

U.S. PATENT DOCUMENTS

| 524,208 | 8/1894 | Kunkle | 137/478 X |
| 2,880,751 | 4/1959 | Tobis | 137/478 |
| 3,572,372 | 3/1971 | Moore | 137/477 |
| 4,289,339 | 9/1981 | Hansen | 285/404 X |
| 4,304,424 | 12/1981 | Hansen | 285/404 X |
| 4,318,639 | 3/1982 | Schosek | 285/404 X |

FOREIGN PATENT DOCUMENTS 522203 2/1956 Canada ................................. 137/478

Primary Examiner—Harold W. Weakley
Attorney, Agent, or Firm—William L. Botjer

[57] ABSTRACT

An improved pressure relief valve with an improved device for securing the blowdown ring of the valve without compromising its pressure integrity. These pressure relief valves include a nozzle extending into the interior of the valve and communicating with the pressure vessel and a blowdown ring which is threaded to the nozzle. Atop the nozzle's opening is a disc which is spring biased into engagement with the nozzle to seal same. The device includes an annular collar surrounding at least a portion of the blowdown ring and the nozzle, a first locking member secures the blowdown ring to the collar and a second locking member secures the collar to the nozzle. The device may utilize the wire seal required by many safety codes.

7 Claims, 3 Drawing Figures

BLOW DOWN RING LOCKING DEVICE

BACKGROUND AND SUMMARY OF THE INVENTION

This invention relates generally to pressure relief valves and specifically to a device for securing the blowdown ring of the valve. Pressure relief valves are required to be used on a large number of pressure vessels. The function of these valves is to open when a certain pressure has been reached within the vessel. The opening of the valve exhausts the pressure within the vessel. Conventionally, such valves include an outer housing into which a nozzle communicating with the pressure vessel is inserted. A disc is biased against the nozzle's opening to seal same. A large coil spring, whose tension is adjustable, biases the disc into engagement with the nozzle through a disc holder. Adjusting tension of the coil spring alters the pressure at which the disc will unseat from the nozzle or "pop". After the pressure has been exhausted from the vessel, the combination of spring bias and blowdown ring setting will cause the disc to reseat or close at a pressure below that at which the valve opened.

The nozzle has external threading and threaded thereto is a device known as a blowdown ring. The threading on the nozzle and the blowdown ring permit the blowdown ring to be axially adjusted with respect to the nozzle as the blowdown ring is turned. The axial position of the blowdown ring determines the efficiency of the huddling chamber which creates "pop" action and the pressure at which the valve will blowdown or close. Thus, in such valves, the opening pressure is adjusted by adjusting the tension of the coil spring while the closing or reseat pressure is adjusted by adjusting the position of the blowdown ring. The blowdown ring used in usual pressure relief valves generally has a knurled or a gear-like outer surface with radially extending teeth. The purpose of the teeth is to permit the blowdown ring to be secured in place with respect to the nozzle by means of an external locking device which extends through the outer housing. However, the fact that an opening must be made in the housing for the locking device, seriously compromises the pressure integrity of the housing and the valve as a whole. The opening can provide an escape point for the pressurized fluid. Any escape of pressurized fluid can be dangerous, especially if the pressure vessel contains toxic or poisonous gas or liquid. Leakage can be extremely dangerous in certain petroleum, chemical or nuclear applications and may result in the release of hazardous materials. Where the pressure relief valve design utilizes more than one blowdown or control ring, additional openings are required in the valve housing to carry the additional locking devices. It is desirable that the number of points of potential leakage in safety relief valves be reduced as much as possible.

Another problem exists with respect to the conventional blowdown ring locking devices. Because such devices are externally accessible, the possibility exists that these devices will become damaged through inadvertant contact or be intentionally tampered with. Damage or intentional tampering can cause the locking device to be disengaged from the blowdown ring which will permit the blowdown ring to become misadjusted. The radial projection of this locking device is adjustable such that accurate positioning of the locking device is possible to place the locking portion precisely between the radially extending teeth of the blowdown ring. The blowdown ring should be secured by the locking device such that rotational movement of the ring once adjusted is prevented but no rigid contact exists between the locking device and the blowdown ring. (Misadjustment of the locking device which results in external forces on the blowdown ring may cause faulty valve performance such as leakage.) Furthermore, damage or tampering may cause the external locking device to be removed which will completely jeopardize the pressure security of the valve. Even though safety codes, which govern the construction of such valves, generally require the locking device to be sealed, such seals can easily be broken and thus provide no real security for the locking device.

Generally speaking, in accordance with the invention an improved safety relief valve and an improved locking device for its blowdown ring is provided. The locking device is not externally accessible when installed in closed discharge systems so that it in no way compromises the pressure integrity of the valve and does not permit intentional or accidental misadjustment. The device includes an annular collar surrounding the nozzle and the blowdown ring. A first releasable locking means is used to rotatably secure the blowdown ring to the annular collar. Second releasable locking means are provided to lock the collar against movement to the nozzle. The locking means can be disengaged to permit adjustment of the blowdown ring. The locking device permits the internal use of a seal required by most safety codes so that it will meet the code without the need for any amendments.

Accordingly, it is an object of this invention to provide an improved pressure relief valve and a blowdown ring locking device to secure the blowdown ring of the valve at a desired axial position along the nozzle.

It is another object of this invention to provide an improved pressure relief valve having a locking device for the blowdown ring which is not externally accessible and which prevents intentional or accidental misadjustment.

It is another object of this invention to provide an improved pressure relief valve that permits secure adjustment of the blowdown ring without introducing any external loads or forces on the blowdown ring.

It is another object of this invention to provide an improved pressure relief valve that will meet all present safety codes.

Still other objects of this invention will become apparent upon reading of the detailed specification to follow.

BRIEF DESCRIPTION OF THE DRAWINGS

For a better understanding of the invention, reference is made to the following drawings as well as to the detailed description to follow, in which.

DESCRIPTION OF THE PREFERRED EMBODIMENT

Figure 1:
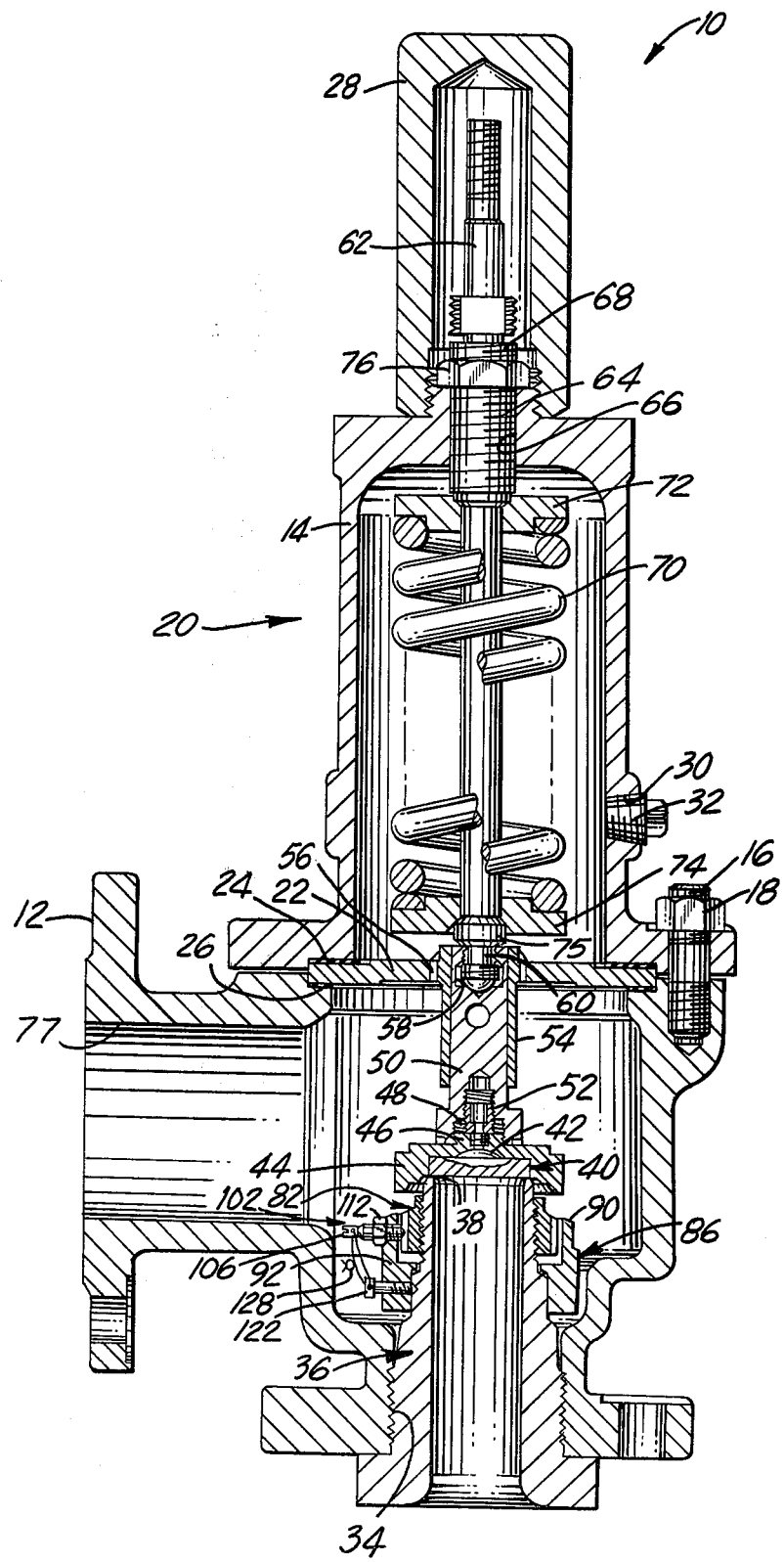
FIG. 1 is a sectional view of a valve constructed in accordance with the invention.

The drawings illustrate the improved pressure relief valve 10 in accordance with the invention. Valve 10 includes a body 12 to which a bonnet 14 is joined by means of a stud 16 engaging a nut 18. Bonnet 14 and body 12 form the housing 20 of the components of the valve 10. Disposed between bonnet 14 and body 12 is a sleeve guide 22 having a bonnet gasket 24 at the interface between itself and the bonnet and a body gasket 27 at the interface between itself and body 12. Threaded to bonnet 14 at its upper portion is a cap 28. Bonnet 14 includes an opening 30 sealed by a threaded pipe plug 32. The invention has been illustrated in a conventional safety relief valve. However, the invention is not limited thereto and may be used in a large number of different valve configurations.

Threaded to the inlet opening 34 in lower portion of body 12 is a nozzle 36 having an opening 38 at its upper end. Disposed above opening 38 of nozzle 36 is a disc 40 which has a semi-spherical protuberance 42 extending from its upper portion. A disc holder 44 engages disc 42 to hold same in contact with the opening 38 in nozzle 36 to seal same against the passage of the pressurized fluid. Disc holder 44 has an externally threaded upwardly extending projection 46 which engages an internally threaded opening 48 in a stem retainer 50. A lock screw 52 securely fastens disc holder 44 to stem retainer 50. Stem retainer 50 is slidably disposed in a sleeve 54 which is joined at its upper portion to an opening 56 in sleeve guide 22.

The upper portion of stem retainer 50 includes an opening 58 into which the lower portion 60 of stem 62 is inserted, stem 62 is free to rotate without turning stem retainer 50. The upper portion of stem 62 is slidably mounted within a spring adjustment screw 64 which in turn is threaded to an opening 66 of bonnet 14. A lock nut 68 is threaded to adjustment screw 64 and locks it in place. The adjustment of screw 64 permits the adjustment of the opening or pop point of the valve as is described in greater detail below. Surrounding stem 62 within bonnet 14 is a coil spring 70 disposed between an upper spring button 72 and a lower spring button 74. Upper spring button 72 rotatably engages the underside of adjustment screw 64. Lower spring button 74 rotatably engages a collar 75 on stem 62. The force of spring 70 is transmitted through disc 40 by means of disc holder 44, stem retainer 50 and stem 62.

As adjustment screw 64 is turned it will be moved upwardly or downwardly, expanding or compressing coil spring 70 as the lower portion of screw 64 contacts and displaces upper spring button 72 while lower spring button 74 remains stationary. As coil spring 70 is compressed, greater pressure is exerted upon disc 40 from nozzle 36. Conversely, when spring 70 is expanded by means of adjustment screw 64 a lesser force is exerted upon disc 40 and a lesser pressure is needed to unseat disc 40 from nozzle 36. When disc 40 is displaced from nozzle 36, the pressurized fluid flows through nozzle 36 and thereafter is exhausted through exhaust opening 77 in body 12.

Figure 2:
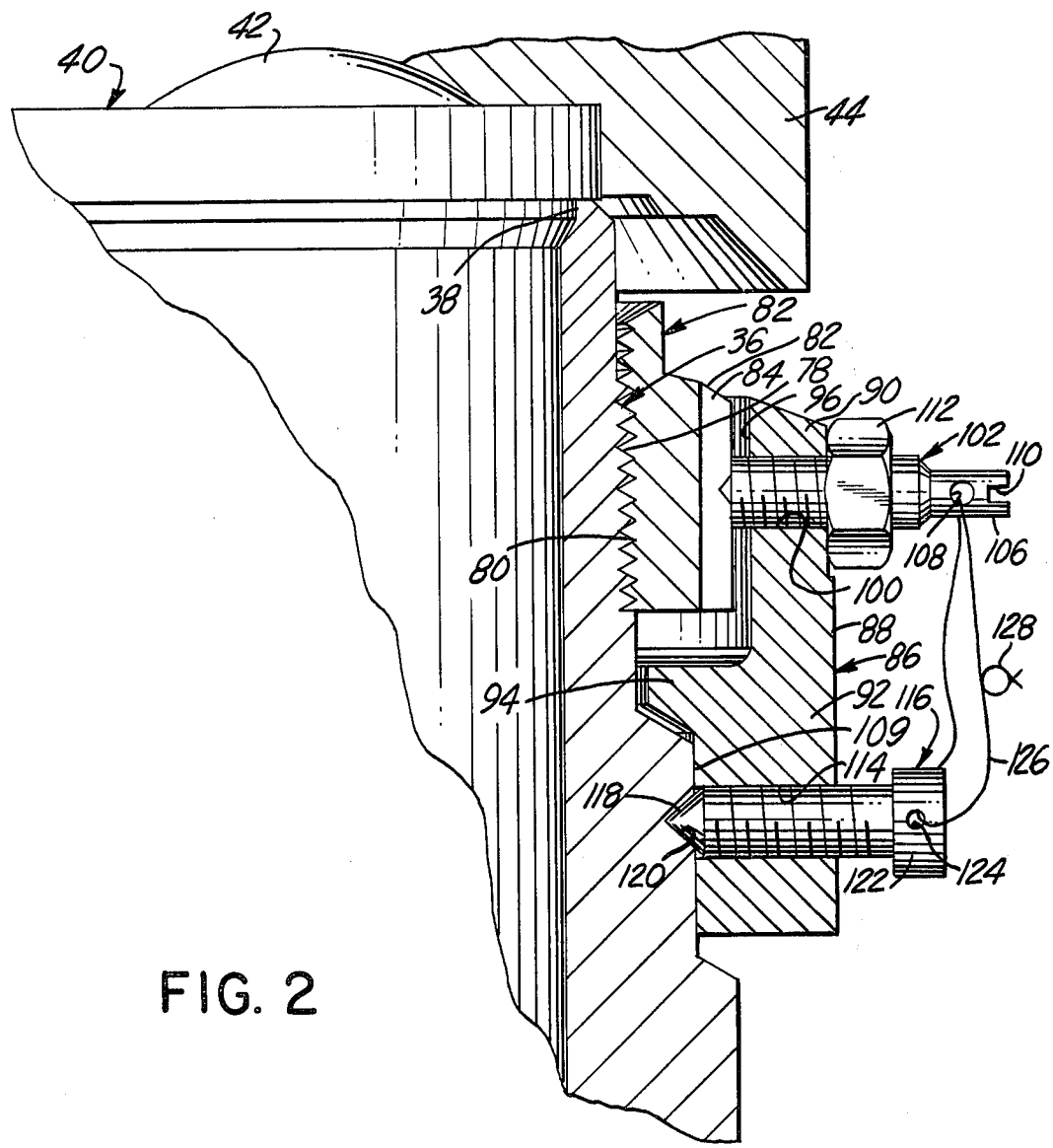
FIG. 2 is an enlarged sectional view of the upper portion of the nozzle.
Figure 3:
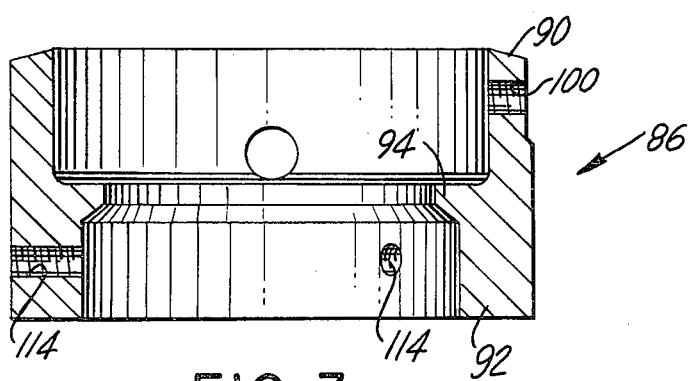
FIG. 3 is a sectional view of the locking collar constructed in accordance with the invention.

FIG. 2 illustrates in detail the upper portion of nozzle 36 and its relationship to disc 40. The upper portion of nozzle 36 has external threading 78 for engagement with the internal threading 80 disposed on a blowdown ring 82. Thus, as blowdown ring 82 is turned with respect to nozzle 36, its axial position with respect to the opening 38 of nozzle 36 is changed. The outer surface of blowdown ring 82 is knurled, serrated or has radially extendng gear teeth 84. As blowdown ring 82 is axially adjusted by means of the threaded engagement with nozzle 36 the blowdown point or point at which the disc 40 will reseat itself on nozzle 36 after the pressure has been dissipated, may be adjusted.

In order to securely lock the axial position of blowdown ring 82 with respect to nozzle 36, a blowdown ring collar 86 is provided. Collar 86 is generally annular in configuration having a cylindrical outer surface 88, an upper portion 90, a lower portion 92 and an inwardly projecting inner rim 94. The inner wall 96 of the upper portion 92 is of a diameter that provides sufficient clearance so that blowdown ring 82 may be turned and axially displaced between inner wall 92 and nozzle 36.

Upper portion 90 of collar 86 includes at least one threaded opening 100 through which is inserted a threaded locking screw 102 which has a conical projection 104 at its forward edge for precise positioning between the knurling, serrations or teeth 84 of blowdown ring 82. The end of lock screw 102 distal to projection 104 includes a narrowed portion 106 having an opening 108 for the insertion of a sealing wire and a slot 110 for insertion of a tool such as a screw driver to turn lock screw 102 to thereby displace same inwardly or outwardly with respect to blowdown ring 82. A jam nut 112 secures lock screw 102 to collar 86. The inner surface 98 of lower portion 92 of collar 86 has a diameter sufficient so as to fit about section 109 of nozzle 36 which has an enlarged diameter.

Lower portion 92 of collar 86 includes at least one opening 114 through which a threaded fastener 116 extends. Fastener 116 includes a conical end 118 for engagement with a conical indentation 120 in section 109 of nozzle 36. The other end of fastener 116 secures collar 86 to nozzle 36 and lock screw 102 thereafter securely locks blowdown ring 82 against movement with respect to collar 86 and thereby nozzle 36. Fastener 116 includes an opening 124 through which a wire 126 which also is inserted through opening 108 in lock screw 102. The appropriate wire seal 128 may then be applied to the joined ends of wire 126.

A preferred embodiment of this invention includes two diametrically opposed openings 100 in upper portion 90 of collar 86, and three openings 114 at 120° intervals in lower portion 92 of collar 86. Thus, it is seen that when the lock screw 102 is displaced out of engagement with blowdown ring 82, turning and adjustment of blowdown ring 82 with respect to nozzle 36 is permitted to thereby adjust the blowdown point of safety valve 10. When lock screw 102 is turned into engagement with blowdown ring 82 and secured by jam nut 112, blowdown ring 82 will be secured against further rotational movement and is accomplished without the need for any opening in housing 20 which would compromise the pressure integrity of valve 10.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and the appended claims.

What is claimed is:
1. A safety relief valve comprising:
 (a) a valve housing;
 (b) a nozzle enclosed within said housing, said nozzle having external threading;
 (c) a blowdown ring threaded to said nozzle, said blowdown ring including serrations;

(d) means disposed about the top of said nozzle to maintain said nozzle closed until a predetermined pressure is reached within said nozzle and to open said nozzle thereafter;

(e) a collar disposed about said blowdown ring and said nozzle and enclosed within said valve body, said collar having a first section proximate said blowdown ring, said collar having a second section proximate said nozzle;

(f) position securing means disposed at said first section of said collar for being releasably disposed between the serrations of said blowdown ring to prevent said blowdown ring from being turned; and (g) fastening means disposed at said second section of said collar for fixing said collar to said nozzle.

2. The safety relief valve as claimed in claim 1, wherein said collar includes an inwardly projecting rib disposed between said first and second sections of said collar, said rib abutting a portion of said nozzle.

3. The safety relief valve as claimed in claim 1, wherein said second section of said collar includes at least three openings, each of said three openings being disposed 120 radial degrees apart, said fastening means extending through at least one of said three openings.

4. The safety relief valve as claimed in claim 1, wherein said position securing means comprises a cylindrical member having external threading engageable with complementary internal threading disposed in an opening on said collar, said cylindrical member being radially displaceable with respect to said blowdown ring as said cylindrical member is turned about its axis.

5. The safety relief valve as claimed in claim 4, further including a jam nut engageable with the external threading on said cylindrical member to lock its position with respect to said collar.

6. The safety relief valve as claimed in claim 1, wherein at least one of said fastening means and said position securing means includes an opening through which a safety wire may be threaded.

7. The safety relief valve as claimed in claim 1, wherein said fastening means includes a member displaceable from a first position out of engagement with said nozzle to a second position in engagement with said nozzle and said nozzle includes an indentation into which said displaceable member of said fastening means is engageable.

* * * * *